Oct. 9, 1945.　　　W. F. REGENHARDT　　　2,386,343
INTERLOCK
Filed May 31, 1941　　　3 Sheets-Sheet 1
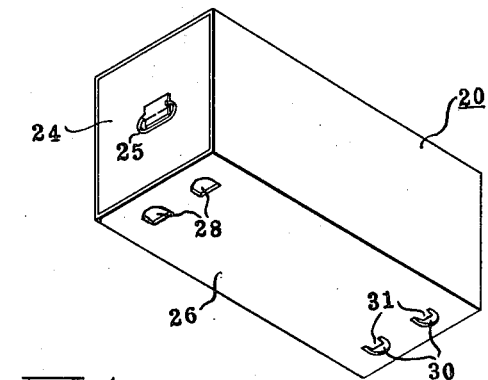
Fig 1
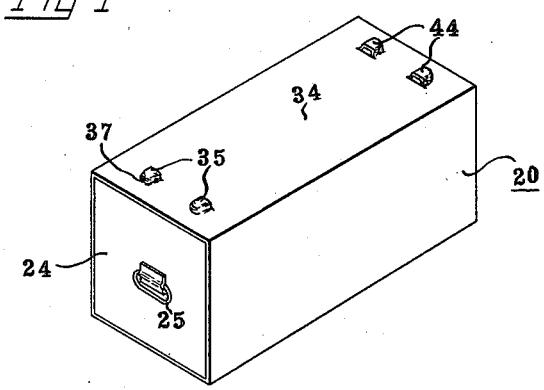
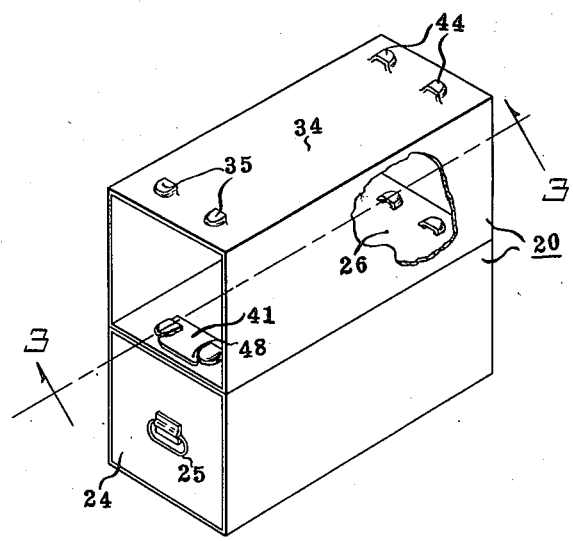
Fig 2
INVENTOR
WALTER F. REGENHARDT
BY
ATTORNEY Oct. 9, 1945.  W. F. REGENHARDT  2,386,343
INTERLOCK
Filed May 31, 1941  3 Sheets-Sheet 2
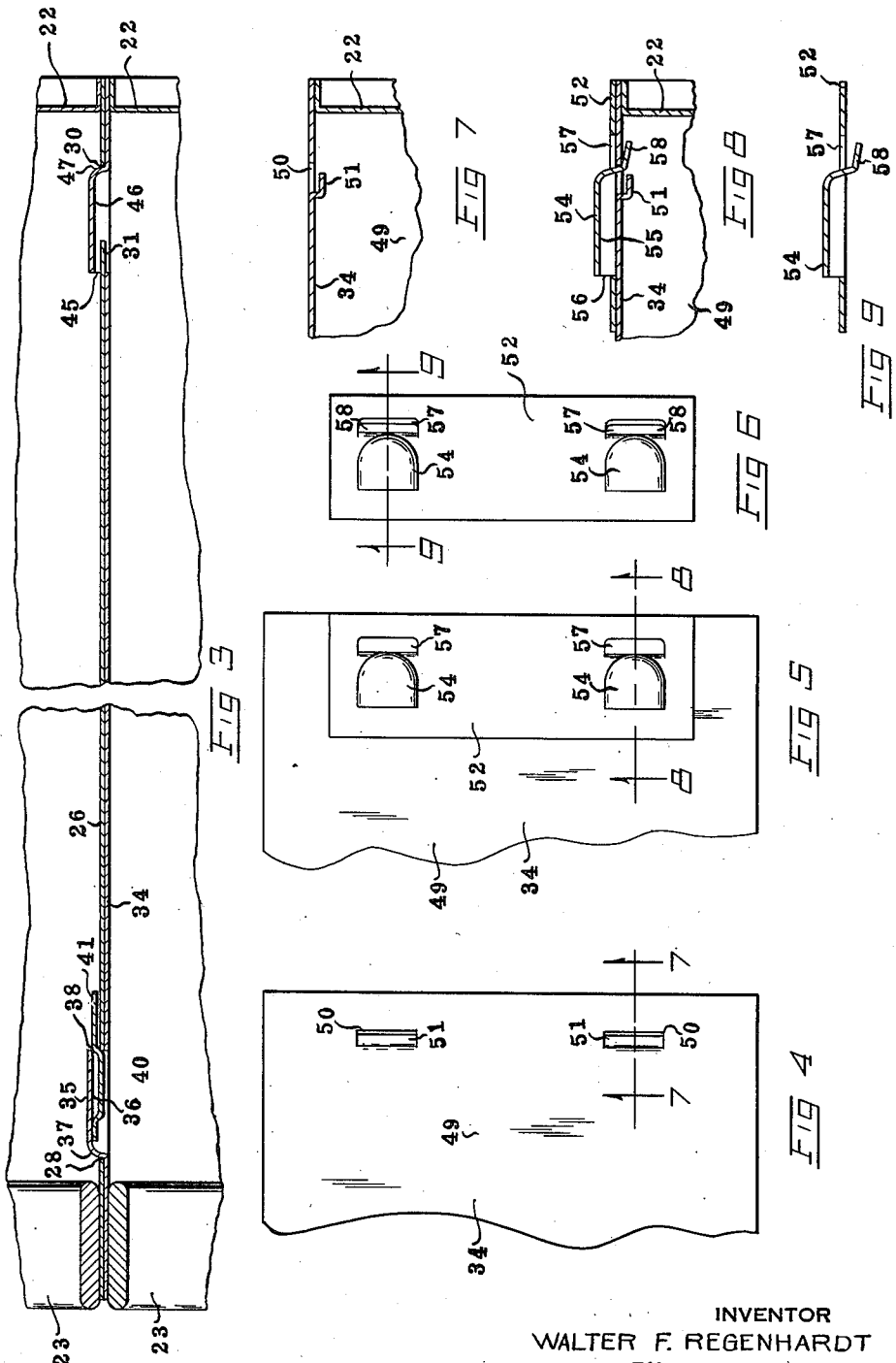
INVENTOR
WALTER F. REGENHARDT
BY
ATTORNEY Oct. 9, 1945.    W. F. REGENHARDT    2,386,343
INTERLOCK
Filed May 31, 1941    3 Sheets-Sheet 3
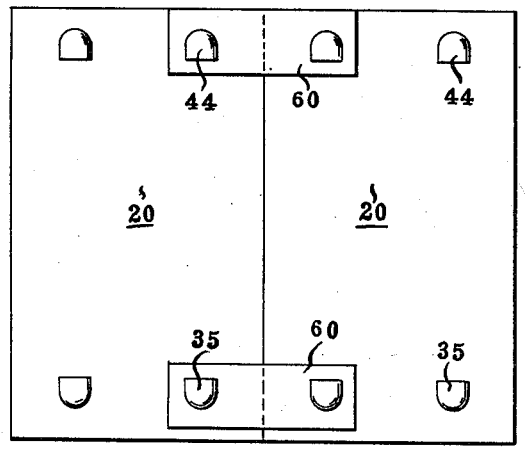
Fig 11
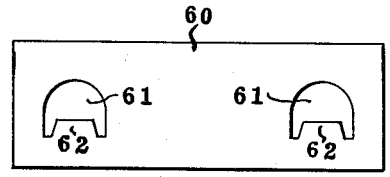
Fig 10
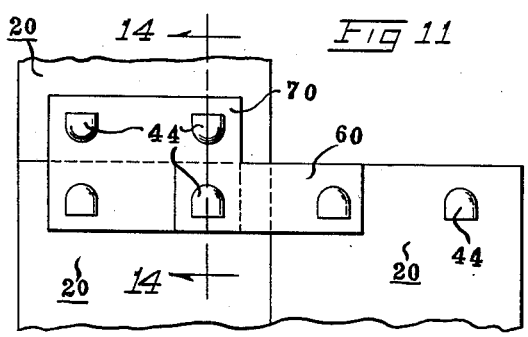
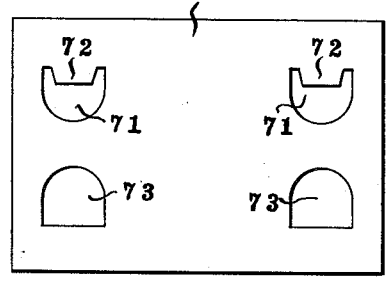
Fig 12
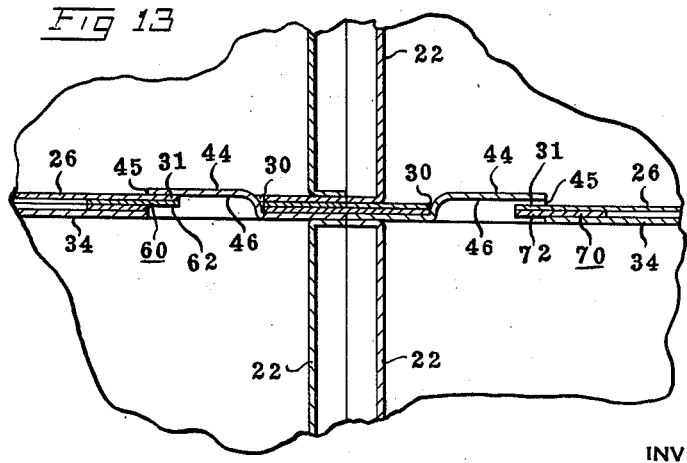
Fig 13
Fig 14
INVENTOR
WALTER F. REGENHARDT
BY
ATTORNEY Patented Oct. 9, 1945

2,386,343

UNITED STATES PATENT OFFICE 2,386,343

INTERLOCK

Walter F. Regenhardt, Wooster, Ohio

Application May 31, 1941, Serial No. 395,999

3 Claims. (Cl. 312—111)

The present invention relates to an interlock, and more particularly to an interlock for locking a plurality of file casings together for forming a filing cabinet.

An object of the invention is to provide mechanism for interlocking two confronting walls of adjacent file casings by merely properly aligning and then sliding one of the casings relative to the other.

A further object of the invention is to provide interlocking mechanism for locking together adjacent walls of file casings, which mechanism may be formed by the material comprising the walls.

Another object of the invention is to provide mechanism for interlocking confronting walls of two file casings, which mechanism comprises a projecting locking member on one of the walls and an element on the other of the walls for extending in a passage formed in the locking member for preventing separation of the walls, the element lying in substantially the same plane as the wall with which it is associated, so that the element will not interfere with or catch on surfaces or objects against which the latter wall may be placed.

A still further object of the invention is to provide mechanism for interlocking file casings stacked on one another and file casings adjacent the stacked casings.

Other objects and advantages of the invention will be apparent from the following description, reference being had to the accompanying drawings wherein preferred forms of embodiments of the present invention are clearly shown.

In the drawings:

Fig. 1 is a view of two file casings, one of which is about to be stacked on the other for forming a filing cabinet;

Fig. 2 is a view showing one of the file casings stacked on the other and attached thereto, the drawer of the upper casing being removed, and a portion of the wall of the upper casing being cut away;

Fig. 3 is a fragmentary view, in section, and on a larger scale, of the file cases shown in Fig. 2, the section being taken on line 3—3 of Fig. 2;

Fig. 4 is a fragmentary, plan view of a file casing;

Fig. 5 is a fragmentary, plan view of the casing shown in Fig. 4 having a locking plate attached to the top wall thereof;

Fig. 6 is a plan view of the locking plate shown n Fig. 5;

Fig. 7 is a fragmentary view of the file casing, shown in Fig. 4, the section being taken on line 7—7 of Fig. 4;

Fig. 8 is a view similar to Fig. 7, but the section being taken on line 8—8 of Fig. 5;

Fig. 9 is a sectional view taken on line 9—9 of Fig. 6, but on a larger scale;

Fig. 10 is a plan view of a connector plate;

Fig. 11 is a plan view of two file casings shown connected with one another by the connector plate shown in Fig. 10;

Fig. 12 is a plan view of another form of connector plate;

Fig. 13 is a fragmentary, plan view showing three file casings connected with one another by the connector plates shown in Figs. 10 and 12; and Fig. 14 is a fragmentary view, in section, the section being taken on line 14—14 of Fig. 13, but on a larger scale.

Although the present invention relates to an interlock which may be employed for interlocking two confronting sheet like walls of practically any type, for the purposes of illustrating a preferred form of the invention, I have shown in the drawings two file casings 20, which casings may be interlocked, wall to wall, by my invention. The file casings 20, preferably are each formed by a sheet metal rectangular sleeve formed by any suitable method. The rear end of the sleeve is closed by a sheet metal wall 22, and a rectangularly shaped band 23 (see Fig. 3), preferably formed of steel, is welded to the inside of the sleeve at the forward end thereof. The casings 20 are adapted to receive suitable drawers 24, which drawers are provided with pull handles 25.

The bottom walls 26 of the casings 20 are provided with two openings 28, at the forward ends thereof, and two openings 30 adjacent the rear ends thereof. The openings 28 and 30 may be formed in the bottom walls of the casings by suitable dies, and the openings 30 are formed so that a tongue 31 extends from one edge of each of the openings, rearwardly in the openings. Preferably, the tongues 31 are formed by portions of the metal forming the walls 26, and the tongues extend in the same plane as the walls 26. It is to be noted that by this arrangement there are no projections extending from the bottom walls of the casings. I prefer that the rear of the openings 30 be arcuate in shape.

The top walls 34 of the casings 20 are provided, at their forward ends, with upwardly extending bulged portions 35. These bulged portions may be formed by slitting the top wall and then pressing the material forwardly of the slits upwardly by suitable dies. The dies form the bulges so that the bulges may enter the openings 28 formed in the bottom wall of another casing 20. The bulged portions 35 provide downwardly extending shoulders 36 and forwardly facing shoulders 37. The slits mentioned above cause mouths 38 to be formed in the bulges 35, which mouths face rearwardly. The openings 28 formed in the bottom walls 26 of the casings are of such form that they receive the bulges 35 therein when one of the casings is stacked on another casing, and the edges of the openings 28 closely embrace the sides of the bulges 35 for preventing lateral movement of the casings with respect to one another. The height of the bulges 35 is such that the shoulders 36, formed by the bulges 35, extend beyond the inner side of the bottom wall 26, of the upper casing, so that legs 40 of a suitable locking member 41 may be inserted through the mouths 38 and beneath the shoulders 36.

Two bulges 44 are formed adjacent the rear of the top walls 34 of the casings 20, and these bulges may be formed in a manner similar to that in which the bulges 35 are formed. Preferably, the bulges 44 are formed having forwardly facing mouths 45. These bulges provide downwardly facing abutments 46 and upwardly extending, rearwardly facing shoulders 47, which shoulders are curved at the top of the bulges. Preferably the rear of the bulges 44, which form the shoulders 47, are arcuate in form and shaped similarly to the rear of the openings 30. The bulges 44 are positioned to be in alignment with the openings 30 when the casings 20 are stacked with the side walls thereof in alignment. Preferably, the height of the bulges 44 and also the bulges 35, is such that several thicknesses of sheet metal may be inserted, simultaneously, through the mouths 45 and 38, respectively.

When it is desirable to form a file cabinet by stacking two or more of the file casings 20, the casings 20 are stacked and interlocked by resting the rear of the bottom wall 26 of one of the casings upon the top wall of another of the casings with the tongues 31, of the bottom wall 26, in alignment with and adjacent to the mouths 45 of the bulge 44. The upper casing is then slid rearwardly so that the tongues 31 extend through the mouths 45 and beneath the abutments 46 formed by the bulges 44. The rear edges of the openings 30, engage the curved shoulders 47 of the bulges, and the curved, downwardly extending portions of the shoulders 47, guide the edges of the openings 30, downwardly about the bulges 44. It is apparent that if the rear portion of the upper casing tends to be raised, due to the drawer being drawn partly out of the casing, for example, the tongues 31 will engage the abutments 46 for preventing separation of the casings. Also, the bulges 44 cooperate with the edges of the openings 30 for preventing sliding of the upper casing. After the tongues 31 are inserted under the abutments 46 of the bulged portions 44, the forward portion of the upper casing 20 is lowered so that the casing rests upon the top wall 34 of the lower casing. When in this position, the bulges 35 formed on the top wall 34 of the lower casing will extend through the openings 28, and the legs 40 of the locking member 41 can be inserted in the mouths 38 of the bulges 35 for locking the forward ends of the casings together.

The locking member 41 is similar to that described in my copending application Ser. No. 365,231, filed November 12, 1940. The legs 40 of the locking member 41 are adapted to engage the abutments 36 of the bulges 35 for preventing separation of the forward ends of the casings. Laterally extending portions 48 of the locking member 41 engage the forwardly facing shoulders 37 of the bulges for assisting in locking the member 41 in position. Thus, a composite cabinet may be formed by interlocking the adjacent walls of the casings together by my improved interlock.

Referring to Figs. 4, 5, 7, and 8, some file casings, one of which is shown in part at 49, have been manufactured in which the top walls thereof were provided with bulges similar to the bulges 35, and having slit-like openings 50 formed by making U-shaped cuts in the wall and depressing the metal bounded by the cuts in the form of downwardly and rearwardly extending tongues 51. An example of this type of file casing is more fully shown and described in my application mentioned above. In order to adapt this style of casing for use with the casings 20, I have provided an adapter plate 52 which may be attached to the top walls of the casings 49. The plates 52 are preferably formed of sheet metal, and they are provided with bulges 54, which bulges may be formed similarly to the bulges 44. The bulges 54 are spaced apart the same distance as the bulges 44, and form downwardly facing abutments 55. These bulges are also provided with forwardly facing mouths 56. Elongated slots 57 are formed adjacent the bulges 54, which slots may be formed by making U-shaped cuts in the plate 52, and then turning the metal bounded thereby downwardly for forming tongues 58. The tongues 58 are adapted to be inserted in the openings 50 of the old style casings, and when the plate 52 is slid rearwardly, the tongues 58 move beneath the inner side of the top wall of the casing 49, thereby preventing the plate 52 from being removed upwardly from the casing. It is apparent that a casing 20 may then be attached to the top wall of the old style casing by inserting the tongues 31, formed on the bottom wall 26, into the mouths 56 of the bulges 54, and the tongues 31 will engage the abutments 55 of the bulges 54 for preventing forward tilting of the casing 20. Since the forward part of the casings are locked against lateral movement by the locking arrangement described above with reference to the bulges 35 entering the openings 28, the plate 52 will be prevented from sliding forwardly and disengaging the tongues 58 from the inner side of the lower casing. Thus, the type of casing shown at 40 can be adapted to be used with the casings disclosed in the present application by the use of the plate 52.

Although I have shown how the top and bottom walls of stacked casings may be interlocked, it is to be understood that other walls of the file casings could be interlocked by the same mechanism. For example, the side walls of adjoining cases could be interlocked by my mechanism.

When two or more stacks of casings 20 are arranged side by side for forming a composite filing cabinet, it is desirable to interlock the casings of one stack with the casings of an adjacent stack. Referring to Fig. 10 of the drawings, I have shown a plate 60 which may be used for interlocking two of the casings 20 in adjacent stacks. Plate 60 is preferably formed of sheet metal, and it is provided with openings 61, which openings are similar in shape and size to the openings 30 formed in the bottom walls 26 of the casings 20. Tongues 62 extend into the openings 61, and these tongues 62 are similar to the tongues 31 formed on the bottom walls 26 of the casings 20. The openings 61 are spaced apart so that when the side walls of two casings substantially abut one another, one of the tongues 62 can be inserted into a mouth 45 of one of the bulges 44 formed on the top wall of one of the casings and the other of the tongues 62 can be inserted in the mouth 45 of one of the bulges 44 formed on the top wall of the other of the casings. Also, a plate 60 can be attached in a similar manner to the bulges 35 at the front of the casings. The tongues 62 engage the abutments 36 and 46, formed by the bulges 35 and 44, for preventing the plates 60 from being accidentally removed from the casings, and the edges of the openings 61 cooperate with the sides of the bulges for preventing separation of the casings. This arrangement is illustrated in Fig. 11 wherein two of the plates 60 are shown attached to two casings 20, which casings are arranged with side walls thereof in abutting relation.

As pointed out hereinbefore, the heights of the bulges 35 and 44 are such that several thicknesses of sheet metal may be inserted in the mouths 38 and 45, respectively. Thus, additional casings may be stacked on casings interlocked by the plates 60, and these adidtional casings can be attached to the top walls of the first two casings in the manner described with reference to the casings shown in Figs. 1 to 3.

A filing cabinet may be formed by arranging two or more casings 20 with the rear walls thereof adjacent one another. In this instance it is desirable to secure the rear portions of these casings to one another for forming a composite filing cabinet. Referring to Fig. 12, I have shown a plate 70 which may be used for this purpose. Plate 70 is provided with two spaced openings 71, which openings are similar to the openings 61 formed in the plate 60, and tongues 72 extend in the openings 71. The tongues 72 are similar to the tongues 62 described with reference to the plates 60. The plate 70 is also provided with two openings 73, which openings are similar, in shape and dimensions, to the openings 28 formed in the bottom walls 26 of the casings 20. The openings 71 and 73 are spaced from one another, respectively, the same distance that the bulges 35 and 44 are spaced from one another, respectively. The openings 73 are spaced from the openings 71 so that the tongues 72 may be inserted in the mouths 45 of the bulges 44 formed on the top wall of one of the casings 20, and the openings 73 may receive the bulges 44 of the other casing that is arranged with the rear wall thereof adjacent the rear wall of the first mentioned casing. This arrangement is illustrated in Figs. 13 and 14. It is apparent that the edges of the openings 71 and 73 will cooperate with the sides of the bulges 44 and will prevent the casings from being slid outwardlly from one another. The tongues 72 assist in maintaining the plate 70 in position on the casings. Preferably, the plates 60 and 70 are formed of sheet metal that is sufficiently thin, and the bulges 44 of such height, that both of these plates may be attached to the casings as described hereinbefore, and yet the tongues 31 of another casing may be received in the mouths 45 of the bulges to which the plates are associated. Referring again to Fig. 13, I have shown a plate 60 placed over a portion of the plate 70 and attached to a bulge 44 of one of the casings, which bulge extends through one of the openings in the latter plate, and the other end of the plate is attached to a bulge 44 of another casing located at one side of the first mentioned casing, for attaching another casing 20. Although the plates 60 and 70 overlap one another and surround one of the bulges 44, the bottom wall of another casing can be attached to the latter bulge 44. This is illustrated in Fig. 14 wherein a plate 60 is superimposed over the plate 70, and a tongue 62 of the plate 60 is shown extending in the mouth 45 of one of the bulges 44, and, also, one of the tongues 31 formed on the bottom wall 26 of one of the casings 20 is shown extending in the same mouth of the last mentioned bulge 44.

By my invention, I have provided interlocking mechanism that can be used to interlock adjacent walls of filing cabinets, and which mechanism can be readily formed. Also, the simplicity of the mechanism is such that unskilled persons may readily form a composite filing cabinet by interlocking a plurality of casings.

It is to be understood that the thickness of the sheet metal shown in the drawings has been greatly exaggerated for the sake of clarity, and that when the filing casings and the plates 50, 60, and 70 are formed of material having the proper thickness, the walls of the casings interconnected by the plates 50, 60, and 70 are substantially even and in alignment with one another, although these plates may be interposed between the walls of the casings.

While the forms of embodiments of the present invention as herein disclosed constitute preferred forms, it is to be understood that other forms might be adopted, all coming within the scope of the claims which follow:

I claim:

1. In a filing cabinet, in combination, two walls disposed in side to side relation, means for securing the walls against separation comprising a bulged portion at one end of one wall, said bulged portion having an open side, the other wall having an opening corresponding substantially in shape and position to said bulged portion and receiving the same when said walls are disposed in side to side relation, tongue means on said other wall extending into the opening at one end, said tongue being in the same plane as said other wall and receivable by the open side of the bulged portion on the first mentioned wall when said bulged portion is disposed in the opening in said other wall, and a locking member for said walls at the opposite end of said walls.

2. In a filing cabinet, in combination, a pair of walls disposed in side to side relation, a second pair of walls arranged in substantially the same planes as the first mentioned walls, one wall of each pair of walls having a bulged portion at one end thereof, each bulged portion having an open side, a tie plate interposed between the walls of both pairs of walls and having two openings corresponding substantially in shape and position to said bulged portions, one of said openings receiving the bulged portion of one of said walls and the other receiving the bulged portion of the other of said walls, the other walls of the pairs of walls having openings corresponding substantially in shape and position to said bulged portions and receiving the same when the respective walls of the pairs are arranged in side to side relation, said other walls of the pairs of walls each having a tongue formed integrally therewith and extending into the opening thereof and lying in the same plane as the respective integral wall, the tongue of one of said walls extending into the open side of the bulged portion of the wall mating therewith and the tongue of the other of said walls extending into the open side of the bulged portion of the wall mating therewith, means at the ends of the walls opposite the bulged ends for interlocking the first pair of walls with one another and for interlocking the second pair of walls with one another.

3. In a filing cabinet, in combination, a pair of walls disposed in side to side relation, a second pair of walls arranged in substantially the same planes as the first mentioned walls, one wall of each pair of walls having a bulged portion at one end thereof, each bulged portion having an open side, a tie plate interposed between the walls of both pairs of walls and having two openings corresponding substantially in shape and position to said bulged portions, one of said openings receiving the bulged portion of one of said walls and the other receiving the bulged portion of the other of said walls, a tongue formed integrally with the tie plate and extending into the open side of one of the bulged portions, the other walls of the pairs of walls having openings corresponding substantially in shape and position to said bulged portions and receiving the same when the respective walls of the pairs are arranged in side to side relation, said other walls of the pairs of walls each having a tongue formed integrally therewith and extending into the opening thereof and lying in the same plane as the respective integral wall, the tongue of one of said walls extending into the open side of the bulged portion of the wall mating therewith and the tongue of the other of said walls extending into the open side of the bulged portion of the wall mating therewith, means at the ends of the walls opposite the bulged ends for interlocking the first pair of walls with one another and for interlocking the second pair of walls with one another.

WALTER F. REGENHARDT.